US005204904A

United States Patent [19]

Carver et al.

[11] Patent Number: 5,204,904

[45] Date of Patent: Apr. 20, 1993

[54] APPARATUS FOR RECEIVING AND PROCESSING FREQUENCY MODULATED ELECTROMAGNETIC SIGNALS

[75] Inventors: Robert W. Carver, Snohomish; Victor O. Richardson, Seattle, both of Wash.

[73] Assignee: Carver Corporation, Lynnwood, Wash.

[21] Appl. No.: 936,459

[22] Filed: Dec. 1, 1986

[51] Int. Cl.[5] .............................................. H04H 5/00

[52] U.S. Cl. ...................................... 381/13; 455/278; 455/297

[58] Field of Search ............... 455/278, 297, 277, 205; 381/4, 3, 2, 13

[56] References Cited

U.S. PATENT DOCUMENTS

| | | | |
|---|---|---|---|
| 4,063,039 | 12/1977 | Endres et al. | 381/10 |
| 4,157,455 | 6/1979 | Okatani et al. | 381/11 |
| 4,390,749 | 6/1983 | Pearson | 381/13 |
| 4,426,727 | 1/1984 | Hamada | 381/13 |
| 4,491,957 | 1/1985 | Kamalski | 381/13 |
| 4,499,606 | 2/1985 | Rambo | 455/297 |
| 4,566,133 | 1/1986 | Rambo | 455/278 |
| 4,574,389 | 3/1986 | Schotz | 381/10 |
| 4,578,819 | 3/1986 | Shimizu | 455/277 |

OTHER PUBLICATIONS

Duplan Corporation v. Derring Milliken, Inc., et al, 197 USPQ at 444.

*Primary Examiner*—Forester W. Isen
*Attorney, Agent, or Firm*—Hughes & Multer

[57] ABSTRACT

A system for increasing the quality of the sound available from a broadcast, frequency modulated, radio frequency, stereophonic signal. Sound quality is promoted by: (1) so switching between available antennas that the signal available from the antenna receiving the incoming signal which is stronger and contains the least multipath distortion is processed into audio output signals, and (2) at least partially blending stereophonically related audio input signals into a monophonic signal if the modulation of the incoming first and second audio signals decreases below a selected threshold value and if: (a) the multipath distortion in the incoming signal reaches or exceeds a preselected threshold value, or (b) the strength of the incoming signal decreases to, or falls below, an also preselected threshold value.

26 Claims, 7 Drawing Sheets

FIG. 1

FROM SIGNAL STRENGTH LINE AGC EE
22
MULTIPATH AMPLIFIER
28
MULTIPATH COMPARATOR
20
29
TWO STAGE AMPLIFIER
30
ANTENNA DRIVER
RADIO ANTENNA INPUT
124
FF
ANTENNA SWITCHER
38
BACK ANTENNA
26
FRONT (MAIN) ANTENNA
24
56
LOGIC
U ACCD
U CASSETTE
LEADING EDGE DETECTOR
40
50
LEADING EDGE TURN-ON CIRCUIT
LEFT AUDIO OUTPUT CC
RIGHT AUDIO OUTPUT DD
LEFT AUDIO INPUT AA
RIGHT AUDIO INPUT BB

ANTENNA SWITCHER FIG. 5

APPARATUS FOR RECEIVING AND PROCESSING FREQUENCY MODULATED ELECTROMAGNETIC SIGNALS

TECHNICAL FIELD OF THE INVENTION

The present invention relates to novel, improved apparatus for receiving and processing frequency modulated, radio frequency signals and, more specifically, to apparatus of that character which is capable of enhancing the quality of an audio signal generated from a frequency modulated radio frequency signal when multipath distortion of the frequency modulated signal is present and/or when the frequency modulated signal is weak.

At the present time, the most prominent application of the present invention is in the processing of FM (frequency modulated) broadcast signals received by an automotive type vehicle moving at a speed of 15–20 miles per hour or more to minimize the degradation in the audible sound attributable to both: (1) multipath distortion of the incoming signal caused by reflection of the transmitted signal from objects located between the transmitter and the signal receiving antenna, and (2) the noise present in a signal which is weak and therefore has low modulation. The principles of the invention will accordingly be developed primarily by reference to its automotive applications. It is to be understood, however, that this is being done solely for the sake of convenience and clarity and is not intended to limit the scope of the protection to which we consider ourselves entitled as there are certainly other applications in which our invention may be used to advantage including other vehicular applications. Also, the principles set forth herein can advantageously be employed to improve the quality of the audio portion of a video broadcast because the audio signals are broadcast in the FM part of the electromagnetic spectrum.

BACKGROUND OF THE INVENTION

The signals propagated in frequency modulated (FM) broadcasting travel in a line-of-sight path. Receivers disposed in locations without a line-of-sight path to the transmitter often receive plural signals which arrive at the receiver in an out-of-phase relationship because they follow different paths due to diffraction, refraction and/or reflection. The condition is known as multipath reception. Where plural signals arriving at the receiver are out of phase, the signals can partially or completely cancel one another and significantly degrade reception quality. A known expedient for reducing the adverse effects of signal cancellation due to out of phase arrival of the transmitted signals is to provide two antennas at spaced apart locations and/or antennas of different polarizations and to connect the antenna having the stronger signal to the receiver. This is called diversity reception; the benefit accrues because the momentary multipath disturbances may not occur simultaneously at the two antennas.

A number of diversity reception systems have heretofore been proposed. The earlier of these employed a detected, or demodulated, signal to couple the antenna receiving the stronger signal to the FM receiver. In a typical system of this character switching between antennas takes place at a relatively slow rate and is audible to the listener, especially when the program material is broadcast in the typical wide band stereo mode.

Receivers with antenna switching systems of the character just described are disclosed in U.S. Pat. Nos.: 2,729,741 issued Jan. 3, 1956, to Chapman for DIVERSITY RECEPTION SYSTEM; 2,872,568 issued February 1959 to Provaz, and 4,170,759 issued Oct. 9, 1979, to Stimple et al. for ANTENNA SAMPLING SYSTEM;

A similar switching system, which would have the same drawbacks in an FM broadcast receiver system as antenna switching can be effected by a derived audio signal, is disclosed in U.S. Pat. No. 3,476,686 issued Oct. 28, 1969, to Holt, Jr., et al.

Yet another heretofore employed system for enhancing the performance of a radio frequency receiving system requires two receivers or even a receiver for each antenna if more than two antennas are employed. This is expensive and may be impractical because of space limitations in automotive and comparable applications. Multiple receiver systems are described and disclosed in U.S. Pat. Nos.: 3,537,011 issued Oct. 27, 1970, to Escoda for ANTENNA SWITCHING ARRANGEMENT FOR CONTINUOUS SEQUENTIAL SAMPLING AND SELECTION OF BEST SIGNAL and 3,670,275 issued Jun. 13, 1972, to Kalliomaki et al. for ELECTRONIC AND AUTOMATIC SELECTOR DEVICE CONNECTED BY AN ANTENNA ARRAY FORMED BY TWO OR MORE ANTENNAS.

Still other heretofore proposed antenna selection systems, such as those described in U.S. Pat. No. 3,368,151 issued Feb. 6, 1968, to Nerwey et al. for CONTINUOUS ANTENNA SELECTION SYSTEM and in U.S. Pat. No. 4,255,816 issued Mar. 10, 1981, to Grunga et al. for RECEIVING APPARATUS HAVING A PLURALITY OF ANTENNAS are designed for navigation systems, for operation at ultra high frequencies, and for other purposes and are not compatible with frequency modulated stereo signals.

Still another disadvantage of the diversity reception systems described in the foregoing patents, as well as the system of that character described in U.S. Pat. No. 4,499,606 issued Feb. 12, 1985, to Rambo for RECEPTION ENHANCEMENT IN MOBILE FM BROADCAST RECEIVERS AND THE LIKE, is that no provision is made for solving yet another problem that arises in diversity reception receivers, especially those employed in mobile applications. This is the marked deterioration in the quality of the sound which arises as the incoming signal becomes weaker, even though that signal may be free of multipath distortion.

SUMMARY OF THE INVENTION

We have now invented, and disclosed herein, novel improved systems of the diversity reception type which are free of the above enumerated and other defects of heretofore proposed systems of that character. In particular, we have invented and disclosed herein circuitry for processing frequency modulated stereo signals which is capable of reducing the deterioration in the quality of sound attributable to both multipath distortion and decrease in signal strength.

Operationally, our novel system will typically be interposed between the detector from which the audio input signals emerge and circuitry for further processing those signals such as a volume control or a tone control.

At the heart of our novel signal processing system are: (1) circuitry for so switching between antennas that the incoming signal most free of multipath distortion will be employed to generate the wanted audio signals, and (2) associated circuitry for blending the audio signals to reduce discernible noise if the signal being processed contains multipath distortion or if the strength of that signal falls below a preselected level.

Switching between antennas is effected so rapidly that the switching is inaudible.

Also, in the interest of promoting sound quality, our novel circuitry is designed so that one antenna will remain coupled to the signal processing circuitry for at least a minimum period of time, thereby preventing the dithering which might otherwise occur. Such dithering would be undesirable as it would produce glitches in the sound heard by a listener.

In typical applications of the invention, a comparator is utilized to identify incoming signals with sufficient multipath distortion to warrant antenna switching, and the wanted minimum antenna coupling time can be obtained by boosting the comparator threshold to a level that will effectively prevent it from producing an antenna switching output signal for the wanted delay period. This boost of the comparator threshold is made at the time the antennas are switched and each time they are switched.

The circuitry is furthermore preferably designed so that the main or primary antenna will be coupled to the system when the latter is powered up or an AM signal is being received. This also tends to contribute to the quality of the sound available from an audio system employing our novel circuitry.

Even with antenna switching, some multipath distortion may appear in the incoming signal; and a noisy signal may sometimes be received, especially where the receiver is at a distance from the transmitter and the signal is accordingly weak. Our novel system also contributes to the quality of the sound heard by the user in these circumstances by blending the two audio input, or stereo, signals transmitted to that system.

Most of the noise that results in degradation of the audible sound has a frequency above 500 Hz. Consequently, we blend only those components of the audio signals. This has the advantage of substantially reducing the noise while retaining at least some ambience in the audible sound. Also, blending of the stereo signals is increased and decreased gradually as the modulation present in the incoming signal respectively decreases and increases rather than being employed in an all-or-nothing fashion. This, too, contributes significantly to the quality of the ultimately produced sound.

Yet another feature of the novel system disclosed herein is that the circuitry employed to blend the two audio signals can be locked out at the option of the user. Also, this circuitry is automatically locked out when a cassette player or other non-broadcasted source of a stereo signal is being employed and when an AM signal is being received.

Despite the versatility and capabilities of the novel circuitry described above, it occupies very little space. Consequently, it is also well-suited from this point-of-view for the mobile applications for which it is particularly intended at the present time.

Broadly speaking, the concept of blending two related audio signals to reduce the noise and/or distortion experienced by a listener is not new as is shown by U.S. Pat. No. 4,457,012 which issued Jun. 26, 1984, to Robert W. Carver for FM STEREO APPARATUS AND METHOD and is assigned to the assignee of the present invention. However, we implement this concept in an entirely different manner which is effective to clean up both weak and multipath signals but accomplishes these goals in a much simpler fashion and with circuitry which requires considerably less space. This is a considerable advantage in the automotive applications for which the present invention is particularly well suited. At the same time, the circuitry disclosed herein is more versatile in that both antenna switching and blending of the audio signals can be utilized to promote the quality of the sound produced by the system.

OBJECTS OF THE INVENTION

One important and primary object of the present invention resides in the provision of novel, improved systems for receiving and processing frequency modulated electromagnetic signals.

Other also important, but more specific objects of the invention reside in the provision of systems in accord with the preceding object:

(1) in which multipath distortion is reduced by so switching between two antennas as to transmit to the signal processing circuitry of the system that one of the signals available from those antennas which is stronger or more free from multipath distortion;

(2) in which, in conjunction with the preceding object, switching between the two antennas at a rate which would be incompatible with the goal of producing sound of higher quality is prevented by causing the antenna to which a switch is made to remain active for a preselected minimum period of time;

(3) in which, in conjunction with the preceding objects labelled (1) and (2), the circuitry utilized to effect switching between antennas is locked out when an incoming AM signal is being processed by the system;

(4) which, in conjunction with the objects identified as (1) and (2), gives preference to one of the two antennas from which an incoming FM signal can be received;

(5) in which, in conjunction with the objects labelled (1) and (2), the amplitude modulated component of the incoming signal is utilized to detect the present of multipath distortion in that signal;

(6) in which left and right stereo signals are gradually blended into a monaural signal when: (a) the incoming signal is weak, and/or (b) the incoming signal suffers from multipath distortion;

(7) in which, in conjunction with the preceding object, the system reverts to a full stereo separation mode of operation after a predetermined period of time unless reset by an input indicative of the continued absence of a strong and/or multipath distortion-free incoming signal;

(8) in which, in conjunction with the preceding objects numbered (6) and (7), the circuitry employed to blend the left and right stereo signals is locked out when the system is employed to process an incoming signal from a source such az a cassette deck or a compact disc player or an incoming AM (amplitude modulated) signal;

(9) in which, in conjunction with the preceding objects labelled (6) and (7), provision is made for manually locking out the circuitry utilized to blend the left and right stereo signals at the will of an operator;

(10) in which, in conjunction with the objects identified above as (6) and (7), primarily only those components of the left and right stereo signals with a frequency above a preselected threshold frequency are blended.

Other important objects and features and additional advantages of the invention will become apparent to the reader and as the ensuing detailed description and discussion proceeds in conjunction with the accompanying drawing.

DETAILED DESCRIPTION OF THE INVENTION

Figure 1:
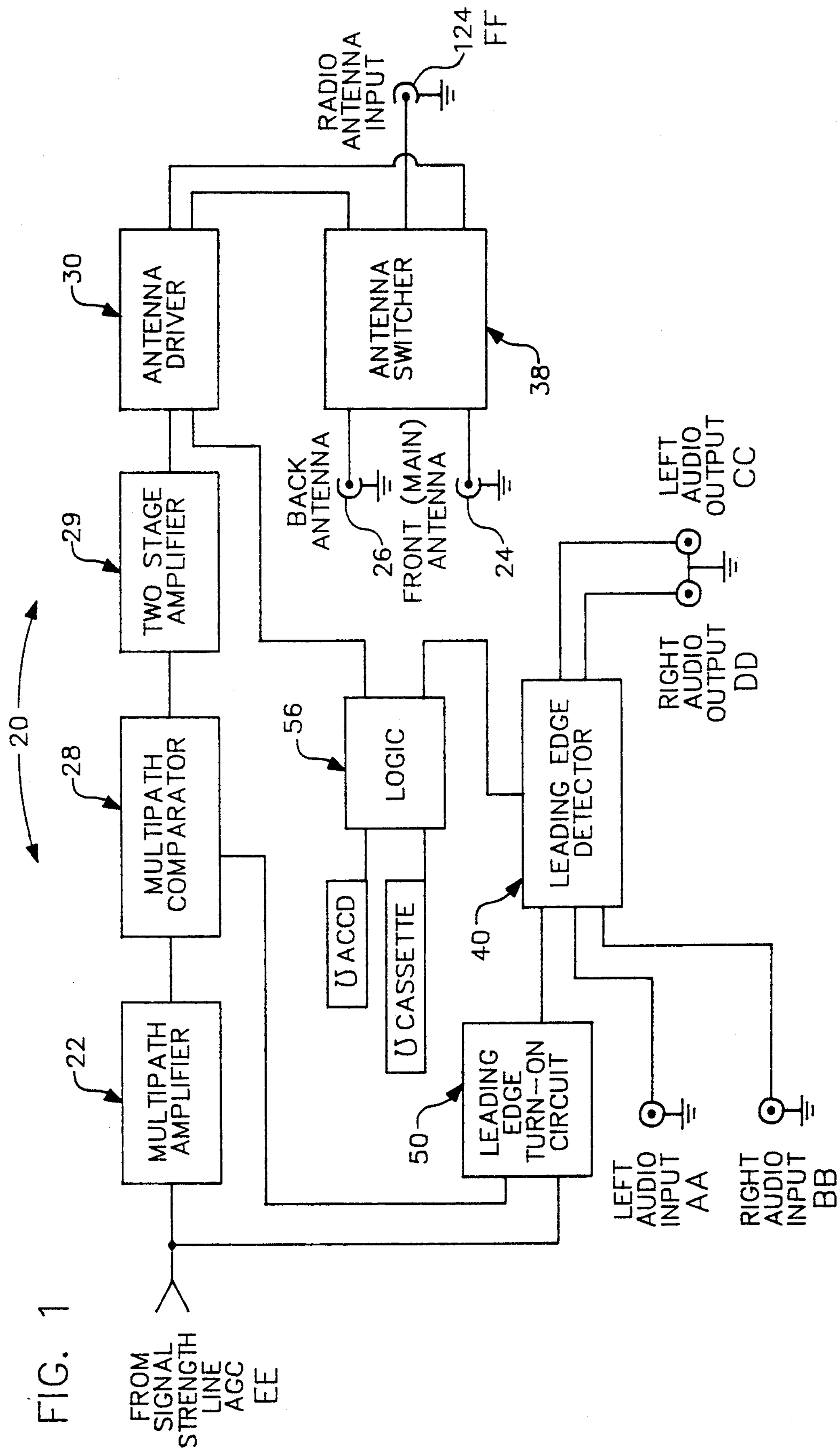
FIG. 1 is a block diagram of system for receiving and processing frequency modulated electromagnetic signals in accord with the principles of the present invention.

Referring now to the drawing, FIG. 1 depicts a system 20 designed in accord with the principles of the present invention. That system selects the more multipath distortion free of two incoming frequency modulated electromagnetic signals and processes the selected signal to reduce noise and/or multipath distortion present therein, also in accord with the principles of the present invention. The control signal is taken from the signal strength (AGC) line of the installation in which system 20 is incorporated; i.e., the control signal is taken off before the incoming signal is decoded so that multipath distortion components can be extracted from the selected incoming signal.

The first major component of system 20 is a multipath amplifier 22. This component is employed to isolate the a.c. component of the incoming signal, this being the signal component containing the multipath distortion. Amplifier 22 also increases the strength of the a.c. signal component to a level where it can be used to determine whether the multipath distortion in the incoming signal is sufficient to warrant switching from one to the other of two antennas 24 and 26 at which the incoming frequency modulated signal is received. Typically, antenna 24 will be the customary front fender mounted antenna or windshield antenna of an automobile; and antenna 26 will be mounted on the rear deck of the automobile.

The signal generated by amplifier 22 is transmitted to an operational amplifier-based multipath comparator 28 where it is compared to a reference signal. This reference signal has a magnitude at which it could be predicted that significant multipath distortion would be present in the output signal from multipath amplifier 22.

If the signal from amplifier 22 is stronger than the threshold signal, comparator 28 will generate an output signal. This output signal is rectified in comparator 28 and then amplified in a two-stage amplifier 29. The amplifier increases the positive voltage pulses to a level at which they are capable of triggering an antenna driver 30. Upon being triggered, the antenna driver causes the then inactive one of the two antennas 24 and 26 to be connected to the signal decoding circuitry of the FM receiver or tuner in which system 20 is incorporated.

We pointed out above that rapid switching between antennas such as those discussed above may adversely affect the quality of available sound to an even greater extent than the multipath distortion present in the incoming signal received by the active antenna 24 or 26. Consequently, there is also preferably included in comparator 28 a delay circuit 32 which will prevent an antenna driver activating signal from being transmitted to that circuit for a specified period of time once the antenna driver has been triggered to make a different one of the two antennas 24 or 26 active (this delay circuit is overridden in situations where multipath distortion is extremely strong and where even dither may be preferable to having the receiver or tuner continue to respond to the more distorted of the two available, incoming signals).

The antenna driver 30 to which the triggering signals generated by comparator 28 are transmitted includes a flip-flop 33 which is used to simultaneously change the states of a normally closed electronic switch S34 and a normally open electronic switch S36, both components of an antenna switcher 38. Normally closed switch S34 connects the main antenna 24 of the installation in which system 20 is incorporated to a radio antenna input FF. It is via this input that the incoming signal received by the active antenna 24 or 26 is transmitted to the decoder (not shown) of the receiver or tuner in which system 20 is incorporated. When closed, normally open electronic switch S36 similarly, and alternatively, connects the second antenna 26 of the installation to antenna input FF.

It is desirable that preference be given to the main antenna 24 of the installation in which system 20 is incorporated. Therefore, we preferably employ in antenna driver 30 a 4013D flip-flop 33 because that type of flip-flop has a built-in memory and, as a consequence, always reverts to the same state when an incoming signal is applied to it. By using that type of flip-flop, one can consequently insure that it will always be electronic switch S34 that is closed and switch S36 that is open when an operating voltage is applied to antenna switcher 38.

It is important, in conjunction with the foregoing, that electronic switches of the diode type (or switches capable of operating at a comparable speed) be employed in antenna switcher 38. This is because switching between antennas 24 and 26 must be accomplished in an extremely short period of time (<10 microsecond) to keep the initial burst of multipath distortion from being audible to the listener.

Despite the switching between antennas described above, the frequency modulated signal available to the receiver or tuner in which system 20 is incorporated may contain sufficient multipath distortion to significantly affect the quality of the audible sound Or, even if multipath distortion is absent, the incoming signal to the tuner or receiver may be so weak that detected audio information is low and considerable noise is present in that signal As was also discussed above, the decrease in the quality of the audible sound attributable to this multipath distortion and to noise in the incoming signal can be reduced by blending the left and right audio input signals made available by the stereo decoder (not shown) of the tuner or receiver in which system 20 is incorporated.

This important function is performed in system 20 by a leading edge detector 40 which includes a ring circuit 42 in which the left and right audio signals are actually blended and a circuit 44 for controlling the operation of the signal blending circuit The leading edge detector control circuit is utilized to gradually increase the capability of two diodes V46 and V48 in circuit 42 to conduct current as the multipath distortion and/or noise present in the incoming, frequency modulated signal increases.

The leading edge detector is also designed so that primarily only those components of the audio signals having frequencies above a selected threshold level (typically 500 Hz) will be blended This best promotes the quality of the audible sound by reducing the effects of multipath distortion and noise in the incoming signal while preserving at least some ambience by maintaining stereo separation at those frequencies where noise and multipath distortion are apt to be absent or least noticeable.

The operation of leading edge detector 40 is controlled by a leading edge turn-on circuit 50. That circuit has inputs from the signal strength line AGC and from the output side of multipath comparator 28 and is therefore responsive to both multipath distortion in the incoming frequency modulated signal and to the changes in the strength of the incoming signal. Basically, the leading edge turn-on circuit is a second operational amplifier-based comparator. In this case, the comparator decides whether the multipath distortion in the incoming signal is sufficiently bad or the signal strength sufficiently low to warrant turning on the leading edge detector in order to blend the left and right audio input signals.

Also incorporated in leading edge turn-on circuit 50 is an R-C network consisting of a resistor R52 and a capacitor C54. This circuit causes the output level of the control signal from the leading edge turn-on circuit to remain high enough after a burst of multipath distortion is detected to keep leading edge detector 40 turned on for a relatively long period of time (4 to 5 second). This produces a smoothness in the audible sound which might not be available if the leading edge detector was turned on and then off, and the audio signals thereby blended and unblended, each time a burst of multipath distortion was detected in the incoming, frequency modulated signal.

Associated with the system components just described is logic circuitry identified generally by reference character 56 in FIG. 1. This circuitry is incorporated in a microprocessor (not shown and not part of the present invention) which is employed to control the operation and various functions of the installation in which system 20 is incorporated. The logic circuitry is, however, relevant to the present invention to the extent that it gives the listener control over the operation of leading edge detector 40; i.e., the listener can lock out the leading edge detector and maintain full stereo separation irrespective of the strength of the incoming signal or the presence of multipath distortion in that signals. Also, this circuitry locks out the leading edge detector in circumstances where blending of the stereo circuits would not be appropriate—for example, when a cassette deck is being played or an AM broadcast is being received.

Figure 2:
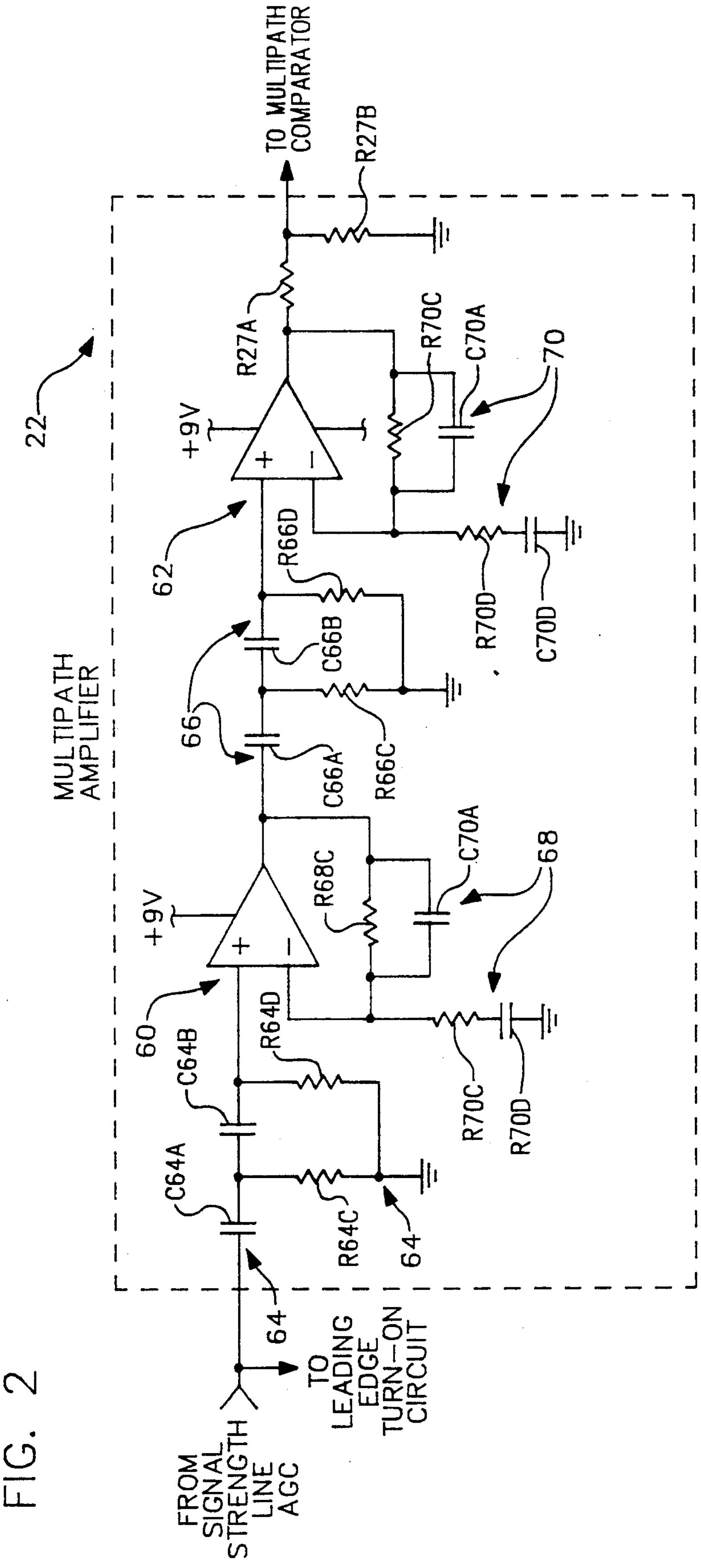
FIG. 2 is a schematic of a multipath amplifier employed in the system of FIG. 1 to isolate and then amplify the multipath distortion containing components of an incoming frequency modulated signal.

Referring now specifically to FIG. 2, the multipath amplifier 22 employed in system 20 to isolate the a.c., multipath distortion containing, components of the incoming, frequency modulated signal includes two noninverting operational amplifiers 60 and 62 cascaded in a bandpass configuration. Operational amplifiers 60 and 62 have high gain and high Q, and they are centered on a frequency of 50 kHz to amplify the multipath noise present in the incoming frequency modulated signal EE taken from signal strength line AGC. As discussed above, the incoming signal is picked up at this point, before it is decoded, so that the multipath distortion components can best be isolated from the incoming signal.

The operational amplifiers are driven through two-pole, high pass input filters 64 and 66 consisting of resistors and capacitors C64A . . . R64D and C66A . . . R66D, and the feedback networks of those amplifiers include two-pole low pass filters 68 and 70 consisting of resistors and capacitors C68A . . . R68D and C70A . . . R70D. The bandpass filters filter out the left plus right carrier of the incoming frequency modulated signal. The signal components passed by the bandpass filters are accordingly centered about 50 kHz, and they are boosted approximately 40 db by the two operational amplifier stages.

The signal thus generated in multipath amplifier 22 and indicative of the extent to which multipath distortion is present in the incoming frequency modulated signal EE is transmitted to the multipath comparator discussed above and shown in detail in FIG. 3 through a voltage divider consisting of resistors R27A and R27B which sets the maximum signal voltage for comparator 28.

Turning now to that Figure, multipath comparator 28 features an operational amplifier 72 employed as a comparator. The output signal from multipath amplifier 22, which is indicative of the extent to which multipath distortion is present in the incoming, frequency modulated signal, is applied to the noninverting terminal 74 of the operational amplifier; and a d.c. reference voltage, typically on the order of 3.5 volts, is applied to its inverting terminal 76. The reference voltage is obtained by dividing the plus 9 volts available on line 78 in a voltage divider consisting of resistors R80 and R82.

The output from operational amplifier 72 is applied to a diode V84 to convert the output from operational amplifier 72 to a series of pulses with positive going voltages. The rectified output signal is transmitted to two-stage amplifier 29. As indicated above, that amplifier is employed to insure that the output signal from the comparator is at a level at which all of the positive voltage pulses making up that signal are capable of triggering the flip flop 33 in antenna driver 30.

The output signal from operational amplifier 72 is also transmitted to the delay circuit 32 employed to insure that antenna switcher 38 is not operated so often that the switching between antennas 24 and 26 would detract from the quality of the audible sound experienced by the listener.

Feedback or delay circuit 32 includes a transistor V85, which is is turned on by the positive, output signal pulses from operational amplifier 72; resistors R86 and R88; and a capacitor C90.

With transistor V85 turned on, and conductive, current flows through resistor R86, the transistor, and resistor R88 to a summing junction 92. Here, the electrical signal in question is summed with that generated by voltage divider containing resistors R80 and R82 and applied to the inverting terminal 76 of operational amplifier 72. This raises the threshold level of the operational amplifier. Consequently, ensuing bursts of multipath distortion will not result in the operational amplifier producing an output signal until the charge has leaked from capacitor C90. As a result, closely spaced bursts of multipath distortion will not trigger the operational amplifier, the flip flop 33 and antenna driver 30 will remain in the same state, and the electronic switches S34 and S36 and antenna switcher 38 will do the same. That causes the active antenna 24 or 26 to remain connected to the radio antenna input FF in circumstances involving closely spaced bursts of multipath distortion.

Figure 3:
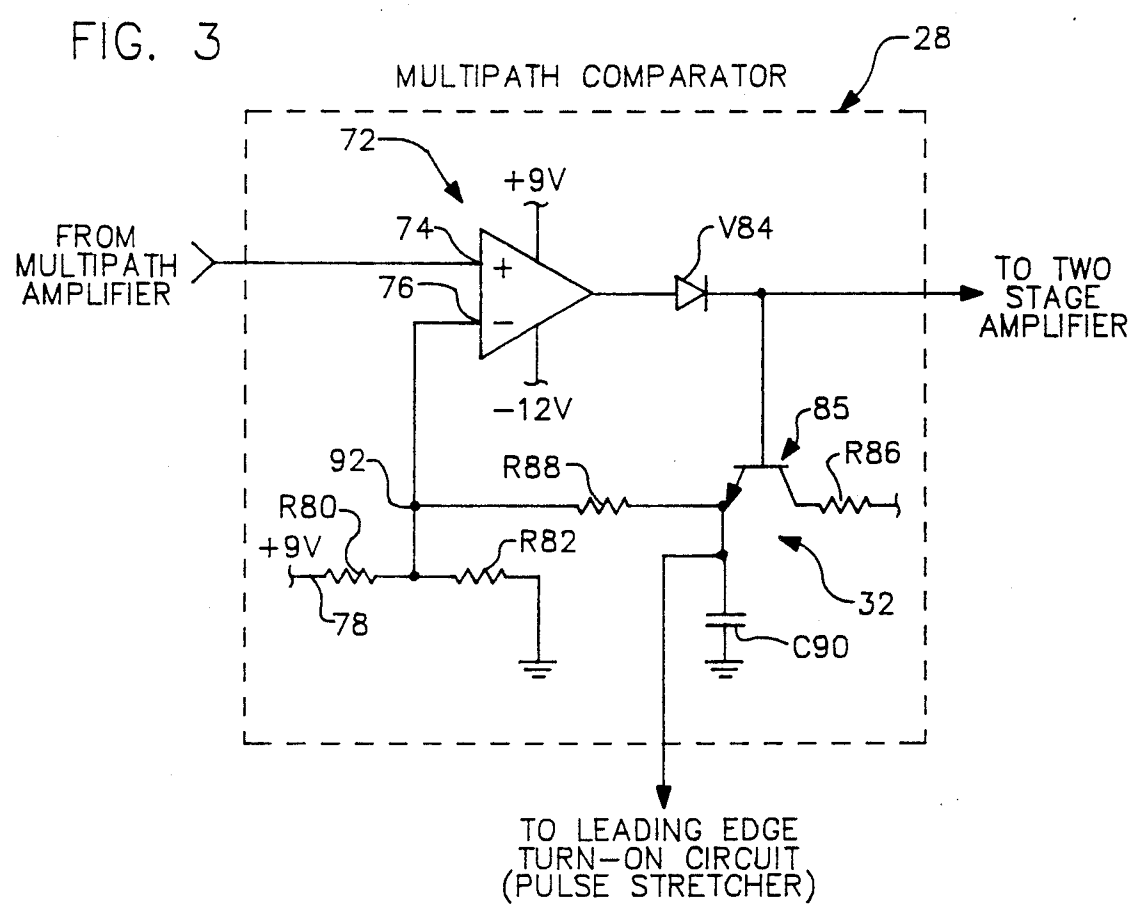
FIG. 3 is a schematic of a multipath comparator employed in the system of FIG. 1.

Referring still to FIG. 3, capacitor C90 is driven with current through resistor R86 to smooth the charge applied to the inverting terminal 76 of operational amplifier 72 through resistor R88. This capacitor, which is charged when transistor V85 is conductive, also acts in concert with resistors R86 and R88 to establish the threshold level of the electrical signal applied to the inverting terminal 76 of operational amplifier 72.

Absent smoothing capacitor C90, circuit 32 would simply operate as an a.c. feedback circuit, and operational amplifier 72 would function as a normal amplifier rather than as a differential amplifier as is necessary to the intended operation of system 20. That is, for system 20 to operate as intended, it is necessary to convert the positive output pulses from the operational amplifier to an averaged, d.c. voltage which, as indicated above, is applied through resistor R88 to summing junction 92 and, via the latter, to the inverting pin 76 of the operational amplifier.

When transistor V85 is turned off by the absence of an output signal from the operational amplifier, the threshold increasing charge applied to capacitor C90 is bled off through resistors R88 and R82 at a decay rate determined by the respective values of these two resistors and the capacitor. Typically, these values will be so selected that the threshold voltage applied to the inverting pin 76 of operational amplifier 72 will remain at the elevated level for on the order of 100 milliseconds.

In extreme circumstances, the level of the multipath distortion bursts may be so high that operational amplifier 72 will be triggered to produce an output signal as each burst arrives at the active antenna 24 or 26 even though the threshold voltage applied to the operational amplifier may be at the increased level. In these circumstances, the output signals generated by the amplifier are allowed to be applied to the antenna driver 30 as they are generated, even though this may be done in rapid succession. In these circumstances, it has been found that less degradation in the quality of the audible sound results from switching back and forth between antennas 24 and 26 at even a rapid rate instead of leaving the worst antenna coupled to radio antenna input FF.

It was pointed out above that the function of the two-stage amplifier 29 to which the positive, output pulses from operational amplifier 72 are transmitted is to boost those pulses, as necessary, to a rail voltage (typically 9 volts). This insures that each pulse subsequently transmitted to the flip flop 33 of antenna driver 30 will be at a sufficiently high level to cause that flip flop to change state.

Amplifier 29 has two serially connected amplifing stages 94 and 96 of conventional design, which produce a gain of about four. High speed transistors V98 and V100 are used in these stages so that the amplifier will be capable of amplifying output pulses transmitted to it from comparator 28 at a rate substantially in excess of 100 kHz. This is necessary in system 20 because the band width of two stage amplifier 29 must be much greater than the fundamental frequency of a pulsed wave in order to maintain the integrity of the pulses waveshape. This waveshape integrity is needed to maintain the antenna switching speed of system 20. Consequently, a high speed amplifier is required to insure that all the bursts of positive voltage from the operational amplifier 72 and comparator 28 are amplified to the rail voltage. In the illustrated circuit transistor V98 is a MPS 8097, and transistor V100 is a MPS 8093.

Figure 4:
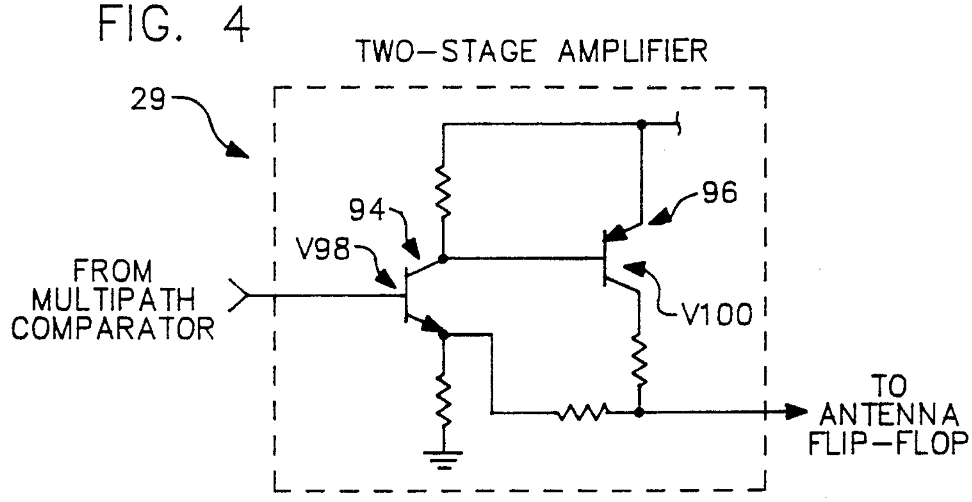
FIG. 4 is a schematic of a two-stage amplifier employed in the system of FIG. 1 to amplify the output from the multipath comparator shown in FIG. 3.

Furthermore, the amplifier 29 illustrated in FIG. 4 is extremely inexpensive whereas operational amplifiers with sufficient speed to perform the functions served by two-stage amplifier 29 would cost on the order of an economically unacceptable $50 each.

It will be apparent to the reader from the foregoing that the amplified positive pulses produced by amplifier 29 are employed to cause the flip flop 33 in antenna driver 30 to change state and, as a consequence of doing so, to cause the closed switch S34 or S36 in antenna switcher 38 to open and the then open switch to close. As one of these switches opens and the other closes, the active one of the two antennas 24 and 26 is disconnected; and the other antenna becomes active, thus insuring that those audio signals converted into the sound heard by the listener are derived from the better of the available, incoming, frequency modulated signals.

Figure 5:
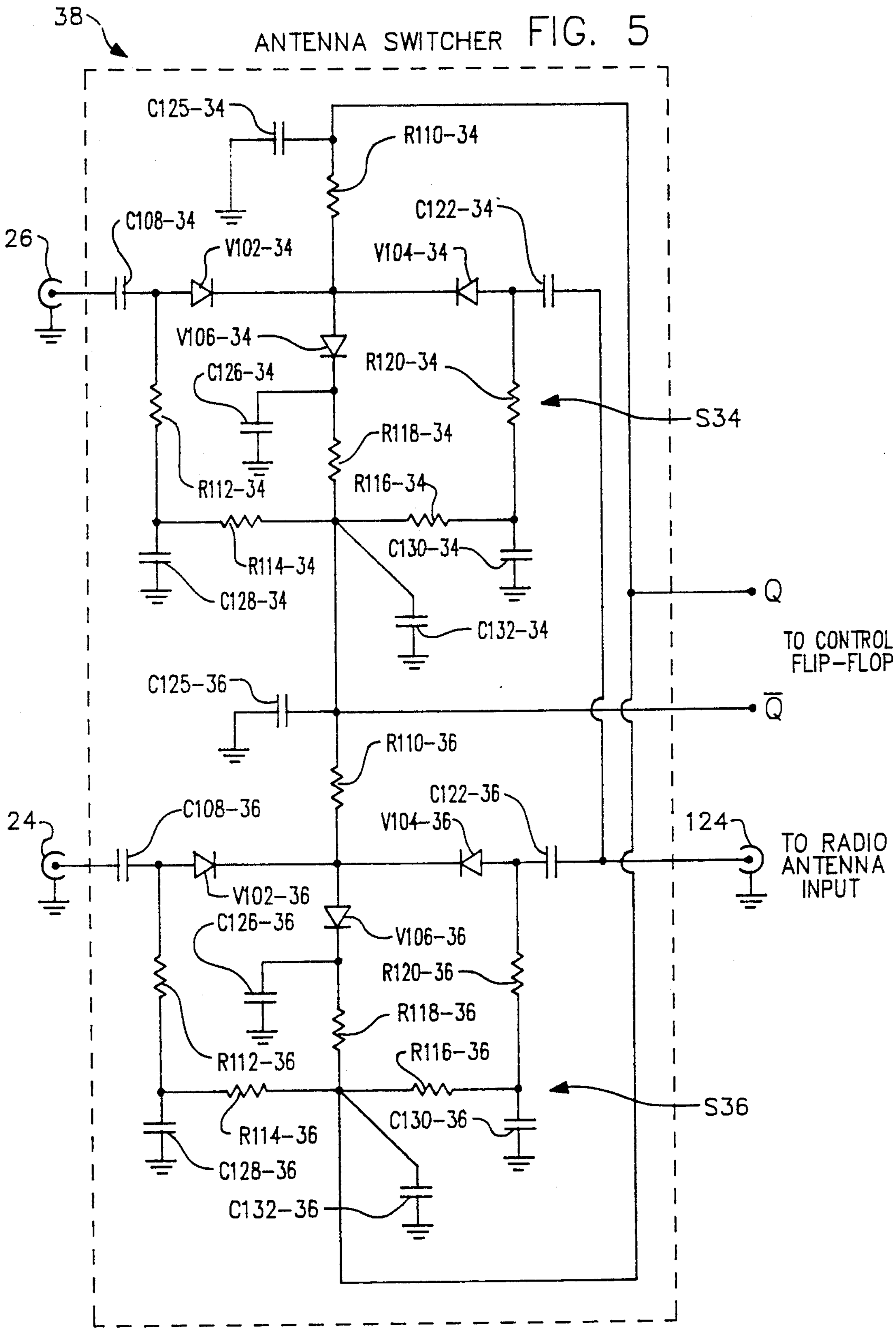
FIG. 5 is a schematic of an antenna switching circuit which is employed in the system of FIG. 1 to so connect one of the two antennas to that system as to transmit the stronger and/or more distortion-free of the two signals available from those antennas to the signal processing circuitry of the system.

Referring now to FIG. 5, the two switches S34 and S36 in the antenna switcher are essentially identical in design; and they operate in the same manner except that switch S36 is open when switch S34 is closed and vice versa. In view of the foregoing, only switch S34 will be described in detail; and reference characters differing only in suffix (34 or 36) will be employed to identify the components of these two switches.

High speed diode switch S34 includes three diodes V102-34, V104-34, and V106-34 wired in a T-arrangement One of the two diodes V102-34 and V104-34 could be eliminated but the use of both in the illustrated relationship is preferred as that arrangement provides superior isolation of the incoming signals between front and rear antennas 24 and 26.

With high speed diode switch S34 closed or active, the frequency modulating signal appearing at antenna 26 is conducted through radio frequency coupling capacitor C108-34 and through diodes V102-34 and V104-

34 The latter are made conductive by the biasing voltages applied to those diodes through resistors R110-34, R112-34, R114-34, R116-34, and R120-34.

Figure 6:
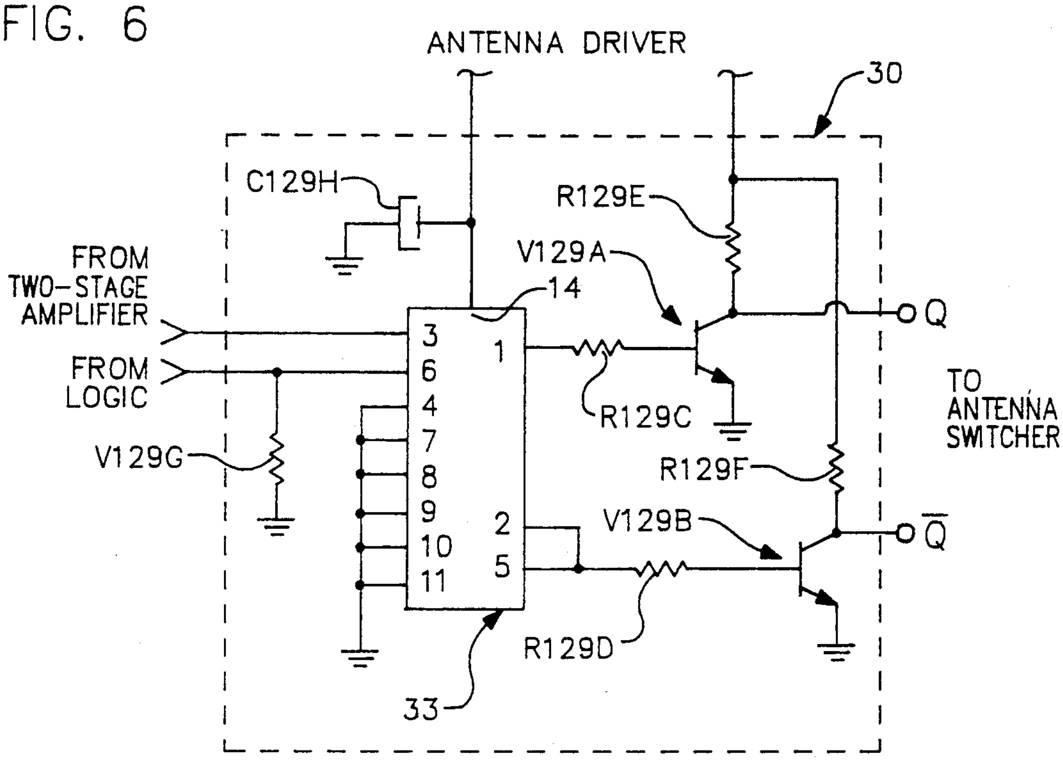
FIG. 6 is a schematic of an antenna driver employed in the system of FIG. 1 to operate the antenna switching circuit shown in FIG. 5.

The biasing voltage is supplied from pin 1 of antenna driver flip flop 33 through terminal Q (see FIGS. 5 and 6). The same biasing voltage applied through resistor R118-34 biases diode V106-34 off.

With diodes V102-34 and V104-34 biased on, and diode V106-34 biased off, the incoming signal is passed through those diodes, and capacitors C122-34 and C108-34 to radio antenna input 124 because the just-described path has an attenuation of only about 2 db. Capacitors C122-34 and C108-34 are blocking capacitors. They pass the incoming frequency modulated signal but not the d.c. control voltages utilized to operate switches S34 and S36.

Associated with the above described circuit components in the high speed diode switch S34 of antenna switcher 38 are capacitors C125-34, C126-34, C128-34, C130-34, and C132-34. These capacitors are also employed to isolate radio frequency signals from the leads extending from terminal Q to diodes V102-34, V104-34, and V106-34. These capacitors also control the impedance of the switch at radio frequency. This is significant because, otherwise, the leads to antenna driver 30 would also function as antennas. That would cause detuning in the front end of the receiver or tuner to which the incoming frequency modulated signal is transmitted through radio antenna input 124 and defeat the purpose of isolated antenna switching.

When flip-flop 33 changes state, a positive voltage is applied to the junction between resistor R110-34 and capacitor C125-34, and the junction between resistors R114-34 and R116-34 goes to ground. This completes a current path through resistor R110-34 to diode V106-34, which has a return path through resistor R118-34 to ground.

At the same time, the positive voltage is applied to the cathodes of, and back biases, diodes V102-34 and V104-34. This turns those diodes off because the anodes of those diodes are basically at ground by virtue of the return path through resistors R116-34 and R120-34 for diode V104-34 and resistors R112-34 and R114-34 for diode V102-34.

With diodes V102-34 and V104-34 turned off and diode V106-34 turned on, there is low impedance through diode V106-34 and a very high attenuation (ca. 50 db) in the path between antenna 34 and radio antenna input FF. This effectively isolates the inactive antenna from the radio antenna input.

In addition to the flip-flop 33 discussed above, the antenna driver 30 employed to control the opening and closing of electronic switches S34 and S36 in antenna switcher 38 includes two transistors V129A and V129B which are shunt switches. As such, they put a short on the control line Q or $\overline{Q}$ with which they are associated when they are turned on. On the other hand, when the transistor is turned off, it allows positive current to flow through associated resistors R129E or R129F and provide a controlline voltage.

Also incorporated in antenna driver 30 are resistors R129C, R129D, R129G, and a capacitor C129H. Resistors R129C and R129D are conventional limiting resistors for transistors V29A and V129B. Resistor R129G is, basically, nothing more than a conventional pull-down resistor in a ground circuit for flip-flop 33, and capacitor C129H is a d.c. bypass. This bypass keeps spurious signals which might be emitted by flip-flop 33 as it changes state from entering other circuits in signal processing system 20.

It was pointed out above that still further improvements in the quality of the sound heard by the listener may be made by blending together those incoming signals which are normally processed separately to provide stereo separation in instances where multipath distortion is present in the incoming signal and in those instances where there is a weak or noisy signal. In those cases, the quality of the sound heard by the listener is further enhanced by blending together the two audio input signals to an extent depending on the weakness of the incoming signal and/or any multipath distortion that may be present in that signal.

Figure 7:
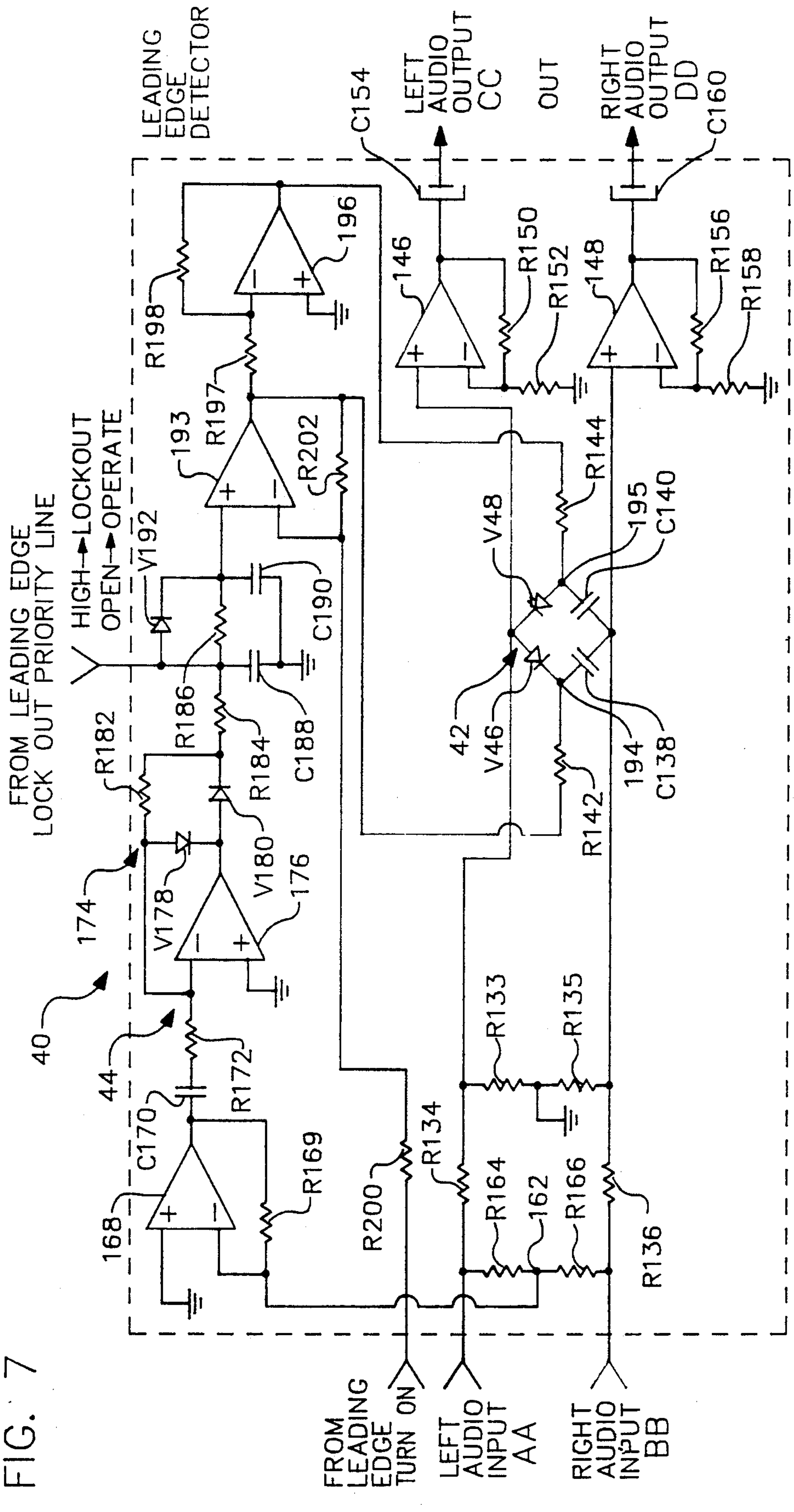
FIG. 7 is a schematic of a leading edge detector employed in the system of FIG. 1 to at least partially blend left and right stereo signals into a monaural signal when the system is receiving a weak FM stereo signal or one suffering from multipath distortion.

The audio input signals which are thus blended together are taken from the output of a conventional stereo decoder chip (not shown). This approach is adopted because the circuit in which those signals are blended, identified by reference character 42 in FIG. 7, is level dependent and because, at the stereo decoder chip output before the signals have been processed through volume controls, tone controls, etc., the levels of those signals are extremely consistent The signals in question, left audio input and right audio input, are identified in FIG. 7 by reference characters AA and BB.

As shown in that Figure, the left audio input signal is applied to a divider network consisting of resistors R133 and R134. This network, which has an approximately eight-to-one ratio, lowers the voltage of the left audio input signal AA. This minimizes the possibility that audio input signal AA might cause distortion in the ring circuit 42 employed to blend the left and right audio input signals.

The second function of the voltage divider network consisting of resistors R133 and R134 is to raise the impedance with respect to the signal blending circuit 42 so that the two audio input signals AA and BB can be properly shunted together in the signal blending circuit.

The right audio input signal BB is similarly processed through a voltage divider network R135 and R136 for the same purposes.

As was mentioned above, the signal blending circuit 42 to which the left and right audio input signals AA and BB are then applied includes two serially connected diodes V46 and V48 which are gradually turned on as the strength of the incoming FM signal decreases and/or as multipath distortion in that signal increases. Thus, as the quality of the incoming signal decreases, the blending of the two audio input signals AA and BB will be gradually increased over a range of typically 20 to 100 percent modulation.

The signal blending circuit 42 also includes two capacitors C138 and C140. Those capacitors are connected in series with diodes V46 and V48 and located in two of the four legs of circuit 42. It is through these capacitors that the left and right audio input signals AA and BB are blended when diodes V46 and V48 are turned on.

Capacitors C138 and C140 will typically have a capacitance on the order of 0.01 microfarad. This is small compared to the 10 and 68 Kohm resistances of the four resistances in the two divider networks. Consequently, circuit 42 will tend to blend only those signal components having a frequency above 500 Hz, the blending effect gradually decreasing at frequencies below this level. This is a significant innovation and an important feature of our invention.

Specifically, most of the noise and multipath distortion which the listener hears has frequencies above the 500 Hz level. Accordingly, by blending signal components with frequencies above that level, the degradation in sound quality attributable to noise and multipath distortion can be reduced to an acceptable level. At the same time, substantial stereo separation or ambience can be retained by not blending the lower frequency, relatively noise and distortion free signal components.

The diodes V46 and V48 in ring circuit 42 are turned on to allow blending of the left and right audio input signals AA and BB by applying a negative going control signal to circuit 42 through resistor R142 and by applying a positive going signal to that circuit through resistor R144. These signals are generated in the leading edge detector control circuit 44 which is discussed in detail in a subsequent section of this detailed description.

Resistors R142 and R144 will typically have a very large (one Mohm) resistance. As a consequence, the negative and positive going signals supplied to blending circuit 42 through those resistors will appear to the diodes basically as current sources. This is important in that the diodes can, as a consequence, be turned on in the wanted gradual fashion rather than being snapped on and off like switches.

Distortion free operation of audio input blending circuit 42 is also promoted by dropping the level of the left and right audio input signals AA and BB through the divider networks composed of resistors R133 and R134 and resistors R135 and R136 as discussed above. Absent this provision for dropping the level of the audio input signals, those signals would also tend to act as control signals; and the result would be logarithmic squared distortion of the blended output signal from signal blending circuit 42.

It will be apparent to the reader that the left and right audio input signals AA and AB are severely attenuated for processing through signal blending circuit 42. Consequently, the audio output signals CC and DD from that circuit are amplified in booster amplifiers 146 and 148 to increase the levels of those signals before they are further processed.

Associated with booster amplifier 146 are resistors R150 and R152 and capacitor C154, and resistors R156 and R158 and capacitor C160 are similarly wired to amplifier 148 (the values of resistors R150, R152, R156, and R158 match the values of voltage divider resistors R133, R134, R135, and R136). The foregoing capacitors and resistors provide buffering between booster amplifiers 146 and 148 and the following stages of the receiver or tuner (not shown) in which our invention is incorporated. Such stages are typically a volume control circuit, a tone control circuit, etc.

Referring still to FIG. 7, we pointed out above that the operation of the just-described audio input signal blending circuit 42 is level dependent and requires the application of both negative going and positive going control signals to that circuit to turn on diodes V46 and V48. These control signals are derived from the left and right audio input signals AA and BB which are applied to a summing junction 162 through resistors R164 and R166 respectively. The summed signal appearing at junction 162 is applied to the inverting terminal of operational amplifier 168, and the noninverting input of that amplifier is grounded. This provides a virtual ground for voltage divider resistors R164 and R166. That ground is important as it eliminates the loss in stereo separation- which would occur if the output signal from the voltage divider network was blended back on the main channel.

As shown in FIG. 7, a resistor R169 is connected between the inverting input and the output of the operational amplifier 168. That resistor is utilized to set the input gain to those stages of control circuit 44 which follow the operational amplifer.

Again, because blending in leading edge detector 40 is made level dependent rather than separation dependent, this simple technique for deriving what will become the control signals can be employed rather than the much more complex circuitry that would be required if the blending circuit 42 were instead separation dependent.

The output from inverting operational amplifier 168 is a wide band, left plus right signal. This signal is applied to a high pass filter consisting of capacitor C170 and resistor R172. The high pass filter tends to pass only those parts of the signal having frequencies above five hundred Hz (the frequency level at which we desire to initiate blending of the left and right audio inputs AA and BB).

The output signal from the high pass filter is applied to the next stage in leading edge detector 40 That stage is a conventional, precision half wave rectifier 174 consisting of an operational amplifier 176 and a network containing diodes V178 and V180 and resistor R182.

The output from rectifier 174 is an unfiltered, half wave, d.c. signal containing all of the positive going pulses in the audio inputs AA and BB. These range from slightly above zero volts to the rail voltage of the rectifier circuit. This will typically be the 12 volts available from an automobile storage battery.

The next stage in control circuit 44 introduces a time constant into the just-discussed d.c. signal. This is important because, if a time constant were not present, the audio input blending circuit 42 could be activated almost continually by small, rapidly dissipating spikes in the d.c. signal. That would be undesirable because elimination of the minor distortion attributable to small spikes by blending audio input signals AA and BB might be more than offset by the loss of ambience that could result from blending those audio input signals. By introducing a time constant, typically with an attack time on the order of 5 milliseconds, into the blending circuit control signal, the control effect of relatively innocuous spikes can be eliminated so that the audio input blending circuit will be turned on only if noise or distortion in the incoming signal is sufficiently significant to make blending of the left and right audio inputs AA and BB desirable.

Another reason for introducing a time constant into the d.c. signal is to insure that the blending circuit is turned on, once noise or multipath distortion does appear in the incoming signal, before that noise or distortion can be heard by the listener.

The circuit for introducing the time constant into the control signal consists of series-connected resistors R184 and R186, capacitors C188 and C190 connected in parallel across resistor 186, and a shunt diode V192 connected around resistor R186. The circuitry just described produces a two-stage time constant with resistor R184 and capacitor C188 providing a first attack time and resistor R186 and capacitor C190 providing a second attack time. This two-stage arrangement is employed because it provides a desired combination of fast attack times and good ripple rejection. If a single stage time constant were instead employed, the decay time would quite possibly be so long that trailing noise would be heard by the listener after the diodes V46 and V48 in signal blending circuit 42 had been turned off to resume the full stereo separation mode of operation.

Relatively gradual changes in the level of the audio input signals will result in capacitor C190 being charged at a relatively slow rate through resistor R186. In contrast, strong positive going pulses, indicative of high modulation levels, turn on diode V192, causing capacitor C190 to be charged much more rapidly. The two charging paths (through resistor R186 and through diode V192) are thereby utilized, along with the very long time constant provided by the capacitor discharge path through resistors R186, R184, and R182, to provide maximum ripple rejection.

The filtered output signal from the circuit just described is applied to an inverting operational amplifier 193 which boosts that signal and, also, acts as a buffer and a level shifter. The operation of leading edge detector 40 depends upon audio input blending circuit 42 being turned on when there is a low level of modulation (high noise level) in the incoming audio input signals AA and BB. This requires that the positive going, zero—10-12 volt control signal be inverted so that a negative signal can be applied to blending circuit junction 194 and allow current to flow through diodes V46 and V48 when a positive voltage is applied to junction 195 of the circuit.

Connected in series with operational amplifier 193 is a unity gain, inverting operational amplifier 196. The output of this amplifier is a complement to that generated by operational amplifier 193 with the complementary signal being employed, when noise and/or distortion are present in audio input signals AA and BB, to apply to ring circuit junction 195 the positive going signal needed to turn on diodes V46 and V48 in signal blending circuit 42.

Resistors R197 and R198 respectively connected to the noninverting input of operational amplifier 196 and between that input and the amplifier output to provide the wanted unity gain.

Leading edge detector 40 is turned on and off to control the application of the just-described negative going and positive going control signals to ring circuit junctions 194 and 195 and thereby control the operation of the input signal blending circuit by a biasing signal generated in leading edge turn-on circuit 50. This signal is applied through resistors R200 and R202 to the output side of the inverting operational amplifier 193 in the leading edge detector when a strong signal is being received by the active antenna 24 or 26 to inactivate ring circuit 42 and maintain full stereo separation.

Figure 8:
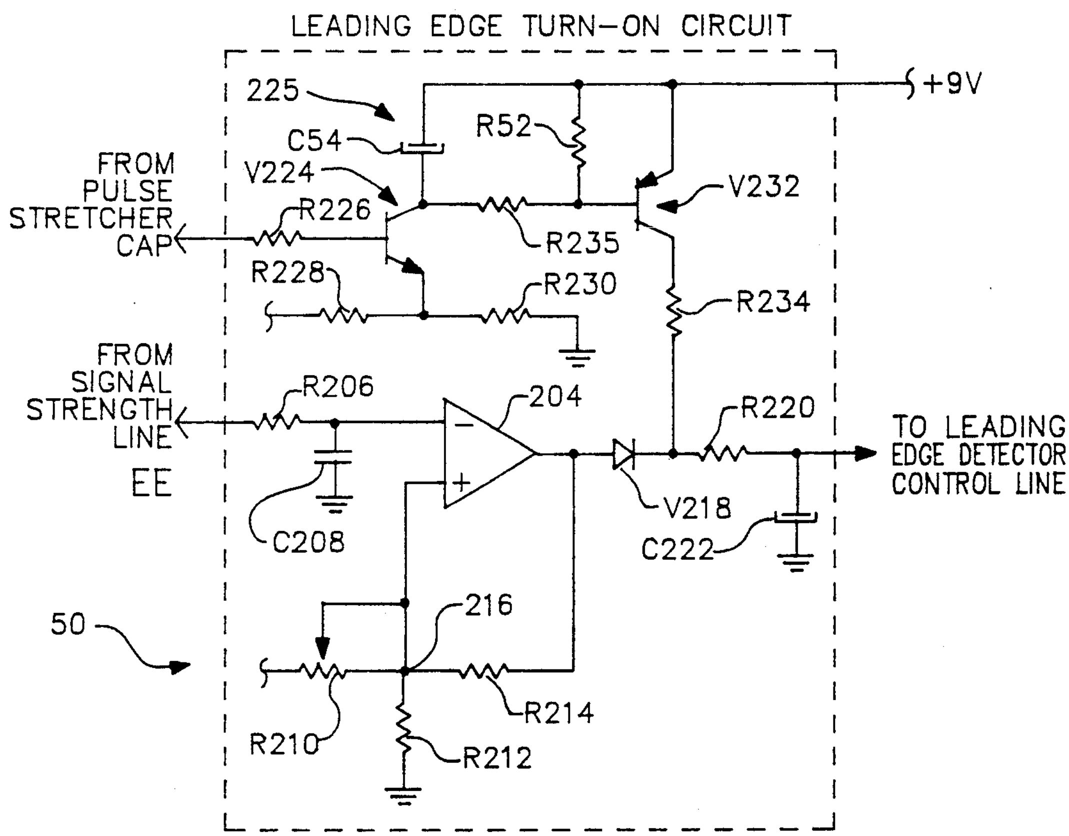
FIG. 8 is a schematic of a leading edge turn-on circuit employed in the system of FIG. 1 to control the operation of the leading edge detector.

Turning now to FIG. 8, the leading edge turn-on circuit 50 in which this biasing signal is generated includes an operational amplifier-based comparator 204 to which the incoming signal EE is fed through a low bandpass filter consisting of resistor R206 and capacitor C208. The bandpass filter screens out multipath distortion and low frequency (below 500 Hz) components of the incoming signal, leaving only signal components representative of the level of the incoming, frequency modulated signal.

A reference signal is applied to operational amplifier comparator 204 through a voltage divider consisting of adjustable resistor R210 and resistor R212. Adjustable resistor R210 is set, typically at the factory, so that comparator 204 will become active and produce an output signal whenever the incoming signal EE reaches the preselected threshold value obtained by setting the potentiometer. Typically, this will be on the order of 2.5 volts.

Also associated with comparator 204 is a positive feedback resistor R214. The feedback circuit applies a negative voltage to the junction 216 common to it and the voltage divider network of adjustable resistor R210 and resistance R212. This lowers the threshold voltage determined by the voltage divider network. That is done to keep comparator 204 from chattering between on and off in instances where the incoming signal varies around the threshold level of 2.5 volts. With positive feedback applied through resistor R214 a considerable variation in signal strength (0.4 volt in the illustrated circuitry) is required to trigger comparator 204, and the chattering which might be induced by smaller voltage variations is thereby eliminated.

With comparator 204 triggered, which means that a strong incoming signal EE is available, the output of the comparator goes to a minus 12 volts in the illustrated, exemplary circuitry. This negative going output signal is blocked by a routing diode V218. This prevents the required offset voltage from reaching operational amplifier 193 and inverting the filtered control signal from C190.

Resistor R220 and capacitor C222 constitute a slow-down circuit for the control signal thus supplied by operational amplifier 204. This slowdown results in the diodes V46 and V48 in signal blending circuit 42 being turned on and off gradually, eliminating the audible pop that would result if those diodes were snapped on like a switch.

The lack of a 12 volt signal keeps operational amplifiers 193 and 196 from supplying through resistors R142 and R144 the negative and positive control voltages needed to turn on the diodes V46 and V48 in the audio input blending circuit 42. A stereo mode of operation results as is of course desirable when the incoming signal is strong.

In contrast, when the incoming signal EE is weak (i.e., below 2.1 volts), comparator 204 is not triggered; its output is plus 12 volts; and operational amplifiers 193 and 196 in leading edge detector 40 apply the above-discussed negative going and positive going signals to junctions 194 and 195 of ring circuit 42, causing ring circuit diodes V46 and V48 to turn on and become conductive. The extent to which these diodes become conductive is determined by the level of the output signals from the operational amplifiers 193 and 196 in the leading edge detector; and the level of these signals is inversely proportional to the level of the incoming frequency modulated signal EE. Thus, the diodes become more conductive and the blending of the audio inputs AA and BB is increased as the level of signal EE drops.

As discussed above, leading edge turn-on circuit 50 is also utilized to generate an independent, multipath distortion responsive, biasing signal for controlling the operation of leading edge detector operational amplifiers 193 and 196 and, therefore, causing the blending of audio inputs AA and BB when multipath distortion of a preselected level is present and maintaining full stereo separation when multipath distortion is not present or is at a level below the preselected one. This biasing signal appears only when the multipath distortion reaches a preselected level.

The multipath distortion triggered biasing signal is derived from the circuit containing the pulse stretcher capacitor C90 in multipath comparator 28 (see FIG. 3). The incoming signal is applied to the base of a transistor V224 incorporated in a comparator 225 through a dropping resistor R226. A threshold voltage is applied to the transistor emitter through a divider network consisting of resistors R228 and R230.

With the voltage of the transistor emitter typically 0.6 volt lower than the voltage applied to its base, transistor V224 will turn on. This turns on associated comparator transistor V232 which applies 12 volts through resistors R234 and R220 to provide the proper bias voltage for operational amplifier 193.

Also included in the comparator circuit is a resistor R235. That resistor combines with above-discussed resistor R52 to form a voltage divider network across capacitor C54. This voltage divider network sets the threshold voltage required to turn on transistor V232.

With transistor V232 conducting, the positive going biasing signal indicative of multipath distortion is generated and applied through resistors R234, R220, R200, and R202 to the output side of operational amplifier 193 in leading edge detector 40 and to the input side of operational amplifier 196. This allows the diodes V46 and V48 in ring circuit 42 to be turned on.

As was pointed out above, leading edge turn-on circuit 50 also includes an R-C network containing resistor R52 and capacitor C54. This circuit causes the aforementioned, multipath distortion indicative biasing signal at the output of comparator circuit 225 to keep ring circuit diodes V46 and V48 turned on for a period which will typically be at least four seconds long. Thus, even a short burst of multipath distortion will result in the leading edge detector being turned and ring circuit 42 kept in operation for a period of that duration. This is a significant feature of our invention as it keeps circuit 42 from being turned on and off with sufficient rapidity to become noticeable to the listener as might be the case if the R-C circuit were not present.

The just-described circuit is connected between the collector of comparator transistor V224 and the base of comparator transistor V232. It is also connected to a typically plus 9 volt power supply.

Figure 9:
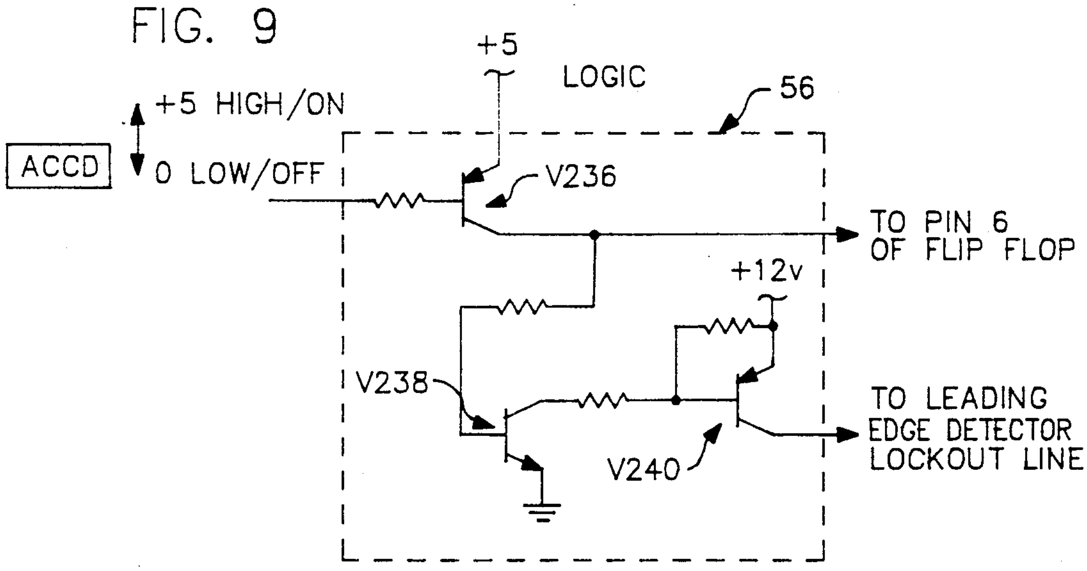
FIG. 9 is a schematic of a logic circuit employed in the system of FIG. 1 to disable certain circuits of that system: (a) automatically when the incoming signal is being generated by a cassette deck, compact disc player, etc.; (b) at the option of the listener; and (c) when an AM broadcast is being received.

A final component incorporated in the sound quality enhancing system 20 described herein is a microprocessor which controls the operation of the receiver, tuner, etc. in which that system is incorporated. The relevant microprocessor circuitry is illustrated in FIG. 9 and identified by reference character 56 as indicated above.

Basically, the illustrated, relevant microprocessor circuitry is employed to turn on the flip-flop 33 in antenna driver 30 so that the connection to the signal processing circuitry cannot be switched from main front antenna 24 to rear antenna 26 and so that leading edge detector 40 cannot be turned on to allow the blending of the audio input signals AA and BB. This can be done at the option of the listener and is done automatically when the audio input is not taken from a frequency modulated off-the-air source; e.g., when a cassette deck or compact disc player or an AM broadcast is the signal source. When the listener switches off the system disclosed herein or that system is automatically switched, the plus 5 volt signal indicated in FIG. 9 is removed from the base of transistor V236, turning on that transistor as well as associated transistors V238 and V240. With transistor V236 turned on, the output from that circuit component is applied to pin 6 of the flip-flop 33 in antenna driver 30. This drives the flip-flop into the state in which is causes main front antenna 24 to become the active antenna. In addition, the flip-flop is kept from being reset so that back antenna 26 cannot be switched into the signal processing circuitry.

Also, with transistor V236 turned on, transistors V238 and V240 become conductive, causing a 12 volt signal to be applied to shunt diode V192 in leading edge detector 40. This is equivalent to applying a strong incoming signal to the leading edge detector. As a result, diodes V46 and V48 cannot be turned on to blend audio inputs AA and BB irrespective of whether or not there is distortion-in the signal and irrespective of the signal strength.

Conversely, when the listener wishes to employ antenna switching and input signal blending in accord with the principles of the present invention, he depresses a typically front panel mounted button (not shown), applying the 5 volt signal to transistor V236 and thereby turning off that transistor and the two associated transistors V238 and V40. This allows flip-flop 33 to change states by being reset in the manner discussed above to switch between front and rear antennas 24 and 26 and select the antenna receiving the better incoming signal. Also, the forward biasing voltage is removed from diode V192, allowing ring circuit 42 to be activated and blend audio input signals AA and AB in the manner discussed above in those instances in which the incoming signal is weak and in those in which multipath distortion is present.

The operation is exactly the same when the illustrated circuitry is employed to prevent antenna switching and the blending of the audio input signals because the incoming signal is not an off-the-air frequency modulated one except that the inputs are automatic instead of manual.

It will be apparent to the reader that the invention may be embodied in specific forms other than those disclosed above without departing from the spirit or essential characteristics of the invention. The embodiments of the invention disclosed herein are therefore to be considered in all respects as illustrative and not restrictive. The scope of the invention is instead indicated by the appended claims, and all changes which come within the meaning and range of equivalency of the claims are therefore intended to be embraced therein.

What is claimed is:

1. In a system for generating stereophonically related, first and second audio signals from an incoming, frequency modulated, radio frequency signal: signal processing means for dividing said first and second audio signals from said incoming signal and for blending said first and second audio signals to the extent that the level of said incoming signal drops below a selected threshold value, the means for blending the left and right audio signals comprising: (1) a ring circuit having four legs with diodes in two adjacent legs and balancing capacitors in the other two of the legs through which said signals are blended as said diodes become conductive to keep excessive d.c. control components from appearing at the output of said ring circuit, and, (2) means for so applying control signals to said ring circuit as to gradually increase the conductivity of said diodes and thereby concomitantly increase the blending of the incoming audio signals as the multipath distortion in those signals increases as the level of those signals decreases.

2. A system as defined in claim 1 which also includes means for attenuating the audio signals applied to said ring circuit to thereby minimize distortion of the audio signals in said circuit.

3. In a system for generating stereophonically related, first and second audio signals from a broadcast, frequency modulated, radio frequency signal: signal processing means for receiving first and second audio signals generated from said frequency modulated signal and for at least partially blending said audio signals into a monophonic audio signal, means providing a continuously variable analog control signal for controlling the aforesaid blending of said first and second audio signals, means providing an enabling control signal, and means automatically operable absent the receipt of a signal from the enabling control signal source when the frequency modulated signal does not include multipath distortions which exceed a threshold value or if the strength of the frequency modulated signal rises to a level above a threshold value for defeating the signal blending operation of said signal processing means, whereby said signal processing means generates only stereophonically related audio signals if said frequency modulated signal does not include multipath distortions which exceed said selected value and the strength of the frequency modulated signal is above the threshold value thereof.

4. A system as defined in claim 3 which comprises means for transmitting the incoming frequency modulated signal prior to decoding to said control signal providing means.

5. A system as defined in claim 3 wherein the means providing said control signal provides a first control signal if the strength of the incoming, frequency modulated signal falls below a selected threshold value and means for furnishing a second independent control signal if the multipath distortion in said incoming signal exceeds a second selected threshold level.

6. A system as defined in claim 5 wherein the means in said control signal providing means for generating said first control signal comprises means for comparing the voltage level of the incoming signal with a threshold voltage and for generating an output signal if the voltage of the incoming signal exceeds the threshold voltage.

7. A system as defined in claim 5 wherein the means in the control signal providing means for generating said second control signal comprises means for comparing the voltage of only the multipath distortion components in the incoming signal with a threshold voltage and for generating an output signal only if the voltage level of the multipath distortion signal components exceeds the threshold voltage level.

8. A system as defined in claim 7 wherein the means for providing said control signal comprises means for deriving that signal from the incoming frequency modulated signal and means for so introducing a time constant into the derived signal as to: (1) keep the signal blending means activated from a small, momentary spike appearing in the incoming signal, and (2) cause said signal blending means to remain activated for a period measured in seconds once it has been activated.

9. A system as defined in claim 3 which includes first and second antennas for receiving the frequency modulated signal, an antenna switcher for operatively connecting only one or the other of said antennas to the input of said signal processing means, and means for so activating said antenna switcher as to switch the connection of the input to said signal processing means from one to the other of said antennas if the multipath distortion in said frequency modulated signal exceeds a threshold level.

10. A system as defined in claim 9 which includes means for turning off said signal blending means after a specified period of time in the absence of an input indicative of the continued presence of multipath distortion exceeding the threshold level in the signal transmitted to said signal processing means.

11. A system as defined in claim 9 which includes: manually operable means for turning off said signal blending means, whereby full stereo separation will be obtained irrespective of: (a) multipath distortion present above a preselected level in the frequency modulated signal available from that antenna operatively connected to the signal processing receiver station, or (b) the level of the frequency modulated signal available from that antenna operatively connected to the signal processing receiver section is below a preselected threshold level; and manually operable means for turning off said signal blending means, whereby full stereo separation will be obtained irrespective of: (c) any multipath distortion in the frequency modulated signal received by the signal processing means, and (d) the strength of the incoming signal.

12. A system as defined in claim 9 wherein the means for blending said signals has means for increasing the extent to which said signals are blended as: (a) the percentage of modulation in the broadcast signal decreases, and (b) the strength of that signal decreases.

13. A system as defined in claim 9 wherein aid signal processing means comprises signal blending means for effecting the aforesaid blending of the first and second audio signals and wherein said signal blending means is capable of blending primarily only those signal components having a frequency above a preselected threshold, whereby ambience is preserved in the sound produced by the system irrespective of the presence of multipath distortion in the signal received by the signal processing means or of the strength of that signal.

14. A system as defined in claim 9 wherein the means for blending said signals has means for increasing the extent to which said signals are blended as: (a) the level of modulation in the broadcast signal decreases, and (b) the strength of that signal decreases.

15. A system as defined in claim 9 wherein said antenna switcher includes: a pair of complementary, diode based, electronic switches, one of said antennas being connectable to said signal processing means through one of said electronic switches and the other of said antennas being connectable to the same signal processing means through the second of said switches; and an electronic antenna driver for so controlling the operation of said switches that one of said switches is closed while the other of said switches is open.

16. A system as defined in claim 9 which has means for so activating said antenna switcher as to switch the connection to the input of said signal processing means from one to the other of said antennas if the signal as received by the said one antenna includes multipath distortions exceeding said threshold value, said last-mentioned means comprising comparator means for generating a control signal during periods when the level of the multipath components in the frequency modulated signal exceeds a selected value and means responsive to said control signal for so activating said antenna switcher as to cause said antenna switcher to switch the connection to said signal processing means input from one to the other of said antennas as aforesaid.

17. A system as defied in claim 16 which includes means operable for a selected period of time after a switching of said connection from one to the other of said antennas as aforesaid occurs to keep said connection from being switched back to the other of said antennas.

18. A system as defined in claim 9 which includes delay means operable upon actuation of said antenna switcher to so connect one of said antennas to said signal processing means as to prevent said antenna switcher from being so triggered as to connect the other of said antennas to said signal processing means for a predetermined period of time, said system further including a comparator having: an output for a signal for triggering the antenna switcher, one input for the incoming signal, a second input for a threshold signal, and means for deriving the output signal by a comparison of the incoming and threshold signals and the means for delaying the triggering of the antenna switcher comprising a capacitor on the output side of said comparator and required to be charged to a selected level before the output signal can reach a strength sufficient to trigger said antenna switcher.

19. A system as defied in claim 18 which includes transistor means operatively connected between the output of said comparator and said capacitor.

20. A system as defined in claim 18 which includes a multipath amplifier for eliminating noise from the incoming signal and for increasing the strength of that signal, said multipath amplifier comprising high pass and low pass filters for filtering out the components of the incoming signal and means for amplifying the remaining a.c. signal components.

21. In a system for generating stereophonically related, first and second audio signals from a frequency modulated, radio frequency signal: first and second antennas for receiving the frequency modulated signal, signal processing means for deriving said audio signals from said frequency modulated signal, switching means for operatively connecting a different one of said antennas to said signal processing means if the multipath distortion in said frequency modulated signal exceeds a threshold level, and delay means operable upon actuation of said switching means to connect one of said antennas to said signal processing means for preventing said switching means from being so triggered as to connect the other of said switching means to said signal processing means for a predetermined period of time, said system further including a comparator having an output for a signal for triggering the switching means, one input for the incoming signal, a second input for a threshold signal, and means for deriving the output signal by a comparison of the incoming and threshold signals and the means for delaying the triggering of the switching means comprising: a capacitor on the output side of said comparator and required to be charged to a selected level before the output signal can reach a strength sufficient to trigger said antenna switching means and, also, transistor means operatively connected between the output of said comparator and said capacitor.

22. In a system for generating stereophonically related, first and second audio signals from a frequency modulated, radio frequency signal: first and second antennas for receiving the frequency modulated signal, signal processing means for deriving said audio signals from said frequency modulated signal, switching means for operatively connecting a different one of said antennas to said signal processing means if the multipath distortion in said frequency modulated signal exceeds a threshold level, and delay means operable upon actuation of said switching means to connect one of said antennas to said signal processing means for preventing said switching means from being so triggered as to connect the other of said switching means to said signal processing means for a predetermined period of time, said system further including a comparator having: an output for a signal for triggering the switching means, one input for the incoming signal, a second input for a threshold signal, and means for deriving the output signal by a comparison of the incoming and threshold signals and a multipath amplifier for eliminating noise from the incoming signal and for increasing the strength of that signal, said multipath amplifier comprising high pass and low pass filters for filtering out the mono and stereo sideband components of the incoming signal and means for amplifying the remaining a.c. signal components and the means for delaying the trigger of the switching means comprising a capacitor on the outside side of said comparator and required to be charged to a selected level before the output signal can reach a strength sufficient to trigger said antenna switching means.

23. In a system for generating stereophonically related, first and second audio signals from a frequency modulated, radio frequency signal: signal processing means for receiving first and second audio signals generated from said frequency modulated signal and for at least partially blending said audio signals into a monophonic audio signal if the frequency modulated signal includes multipath distortions which exceed a threshold value or if the strength of the frequency modulated signal falls to a level below said threshold value, said system also including means which is manually operable to defeat the audio signal blending operation of said signal processing means, whereby the output from said system consists entirely of the stereophonically related first and second audio signals irrespective of the quality of the signal received by said signal processing means, and means responsive to an incoming signal which contains stereo information and is not broadcast, frequency modulated signal for actuating the means for defeating the stereo signal blending operation of the signal processing means.

24. In a system for receiving a broadcast frequency modulated radio frequency signal and for generating first and second, stereophonically related audio signals from said broadcast, frequency modulated signal: means including a pair of complementary operational amplifiers for generating positive going and negative going control signals in response to a decrease in the level of said broadcast signal to a level below a threshold value and signal processing means receiving said first and second audio signals and automatically responsive to the application of said positive going and negative going control signals thereto to at least partially blend said stereophonically related audio signals into a monophonic audio signal.

25. In a system for receiving a frequency modulated radio frequency signal and for generating first and second, stereophonically related audio signals from said frequency modulated signal: means for detecting multipath distortions of said frequency modulated signal which exceed a threshold level and for generating an enabling control signal in response to the detection of such multipath distortions of the frequency modulated signal, means for generating a control signal in response to a decrease in the level of the radio frequency signal to a level below a threshold level, and signal processing means receiving said first and second audio signals and responsive to the application of the enabling signal thereto to blend said audio signals into a monophonic audio signal to an extent determined by the strength of said control signal, said system further comprising a circuit which keeps said signal processing means turned on for at least a minimum preselected, multisecond period of time to blend said first and second audio signals into a monophonic audio signal as aforesaid.

26. In a system for generating stereophonically related, first and second audio signals from a frequency modulated, radio frequency signal: signal processing means for receiving first and second audio signals generated from said frequency modulated signal and for at least partially blending said audio signals into an at least partially monophonic audio signal if the frequency modulated signal includes multipath distortions which exceed a threshold value or if the strength of the frequency modulated signal falls to a level below said threshold value, said signal processing means also including circuit elements so related to said signal blending means that those components of the first and second audio signals having frequencies below a selected frequency are blended only to an extent which decreases as the frequencies of those components fall below a selected frequency, whereby said signal processing means can output an audio signal containing a blend of monophonic components of higher frequency and stereophonic components of lower frequency.

* * * * *